United States Patent [19]
Ardon

[11] Patent Number: 5,815,563
[45] Date of Patent: Sep. 29, 1998

[54] TELECOMMUNICATION SYSTEM WITH REMOTE CALL PICK-UP CAPABILITIES

[75] Inventor: Menachem Tsur Ardon, Naperville, Ill.

[73] Assignee: Lucent Technologies Inc., Murray Hill, N.J.

[21] Appl. No.: 572,955

[22] Filed: Dec. 15, 1995

[51] Int. Cl.⁶ .................................................. H04M 3/42
[52] U.S. Cl. ...................... 379/210; 379/211; 379/207; 379/373
[58] Field of Search .................................. 379/210, 211, 379/212, 207, 201, 373, 375, 202

[56] References Cited

U.S. PATENT DOCUMENTS

| 4,351,986 | 9/1982 | Fechalos . | |
|---|---|---|---|
| 4,893,336 | 1/1990 | Wuthnow | 379/210 |
| 5,206,901 | 4/1993 | Harlow et al. | 379/211 |
| 5,329,578 | 7/1994 | Brennan et al. | 379/211 |
| 5,371,781 | 12/1994 | Ardon | 379/59 |
| 5,502,762 | 3/1996 | Andrew et al. | 379/212 |

FOREIGN PATENT DOCUMENTS 2276062  9/1994  United Kingdom .......... H04M 19/02

*Primary Examiner*—Ahmad F. Matar
*Attorney, Agent, or Firm*—Charles L. Warren

[57] ABSTRACT

Remote call pick-up is provided for analog telephones. Upon receiving a call request for a first analog CPE, a first record associated with the first CPE is read. The record contains a directory number for a second analog CPE. The first CPE is rung with a standard ring pattern and the second CPE is concurrently rung with an alternate ring pattern signifying that the second CPE is not the original call destination. The call is completed to the second CPE if a remote call pick-up code is received from the second CPE before the first CPE goes off-hook.

18 Claims, 2 Drawing Sheets

FIG. 3

CALLED PARTY FEATURE RECORDS

| CALLED PARTY ID | ENHANCED CALL PICK UP FEATURE ACTIVATED | SECONDARY LINE TO RING | SELECTIVE RINGING PATTERN | ...... |
|---|---|---|---|---|
| 708-979-1234 | YES | 708-231-5678 | 3 | ...... |
| ⋮ | ⋮ | ⋮ | ⋮ | ...... |
| 708-979-1233 | YES | 312-778-1234 | 5 | ...... |

FIG. 4

ORIGINATING PARTY FEATURE RECORDS

| ORIGINATION PARTY ID | ENHANCED CALL PICK UP FEATURE ACTIVATED | ENHANCED CALL PICK UP FEATURE CODE | ...... |
|---|---|---|---|
| 708-231-5678 | YES | *5 | ...... |
| ⋮ | ⋮ | ⋮ | ...... |
| 312-778-1234 | YES | *5 | ...... |

TELECOMMUNICATION SYSTEM WITH REMOTE CALL PICK-UP CAPABILITIES

BACKGROUND OF THE INVENTION

This invention is directed to telecommunication systems which permit an incoming telephone call to be answered from a line(s) other than the destination telephone line. More specifically, this invention addresses the ability to provide remote call pick-up from an analog telephone(s) at a location where ringing cannot be heard from the destination telephone.

Current telephone switches and private branch exchanges support limited types of remote call pick-up. In an office environment, it is possible for one of a predefined group of telephones to answer an incoming call for one telephone of the group using a group pick-up feature. However, this feature depends upon the ability of others in the group to hear the ringing of the destination telephone associated with the called line.

The known features of "call-transfer" and "call-forwarding don't answer" provide alternatives by which an incoming call can be routed to a different telephone that may not be geographically within the sound of the ringing of the called party telephone. However, use of these features causes all incoming calls to the line with the activated feature to be rerouted to the predetermined alternate directory number. In certain situations this provides an adequate solution to subscriber needs. However, other circumstances exist in which subscribers may desire to have the option to answer an incoming call at the called party telephone or at a remote location(s).

In accordance with U.S. Pat. No. 5,371,781, a technique is discussed in which the terminating called line identification (TCLID) is provided in a wireless communication environment. The display of a TCLID on a screen of a wireless telephone permits the user to determine the original called directory number where a plurality of possible directory numbers may terminate to or be routed to the wireless telephone.

In the integrated services digital network (ISDN) environment, directory numbers can be shared. The sharing of directory numbers permits functions and capabilities to be provided to different ISDN telephone instruments. However, this capability requires that the switching facilities and the telephone instruments be compatible with ISDN and that such ISDN functionality will have been allocated.

Another way to allow a customer to answer a call in more than one location is via the use of party-lines associated with each other by permanently being bridged. In this case the arrangement of associating the lines requires a hardware bridging of the lines through a permanent hardware connection such as at the main distributing frame. The two lines can not be independently engaged in two different calls. A party-line like feature may also be provided via a software implementation which allows time slot bridging. This feature provides two lines with different directory numbers to be bridged when an incoming call arrives at one of the two lines. Again the two lines maintain the characteristics and limitations of party lines. Additionally, in the case of time slot bridging, setting up each call requires two simultaneous and independent call set ups and path hunts, and resources for bridging the lines, such as conference circuits, regardless whether the second party intends to answer the call or not. It becomes extremely inefficient and highly impractical to implement this technique so that a plurality of lines can respond to incoming calls. Alerting all the associated lines of an incoming call becomes a burden.

There exists a need to provide subscribers with the flexibility of answering an incoming call at either an analog telephone associated with the original dialed directory number or from a remote analog telephone(s) at the discretion of the subscriber.

SUMMARY OF THE INVENTION

It is an object of the present invention to provide a solution to this need by providing an enhanced remote call pick-up feature for analog telephones.

In accordance with an embodiment of the present invention which provides remote call pick-up using analog phones, a request for a call to a first analog line or customer premises equipment (CPE) is received. A record associated with the first line/CPE stored in a database is read. The record contains a directory number for a second analog line/CPE. The first line/CPE is rung with a standard ring pattern and the second line/CPE is concurrently rung with an alternate ring pattern that signifies the second CPE is not the original destination of the call. The call is completed to the second CPE if a remote call pick-up code is received from the second CPE before the first CPE goes off-hook. If the first CPE goes off-hook before the remote call pick-up code is received, a ring termination message is generated to terminate ringing at the second CPE. It is also contemplated that a plurality of remote lines/CPE could be concurrently rung thereby permitting a corresponding number of options for the subscriber to answer the incoming call.

BRIEF DESCRIPTION OF THE DRAWINGS

FIG. 3 is a table illustrating exemplary records associated with called party features.

FIG. 4 is a table illustrating exemplary records of originating party features.

DETAILED DESCRIPTION

Figure 1:
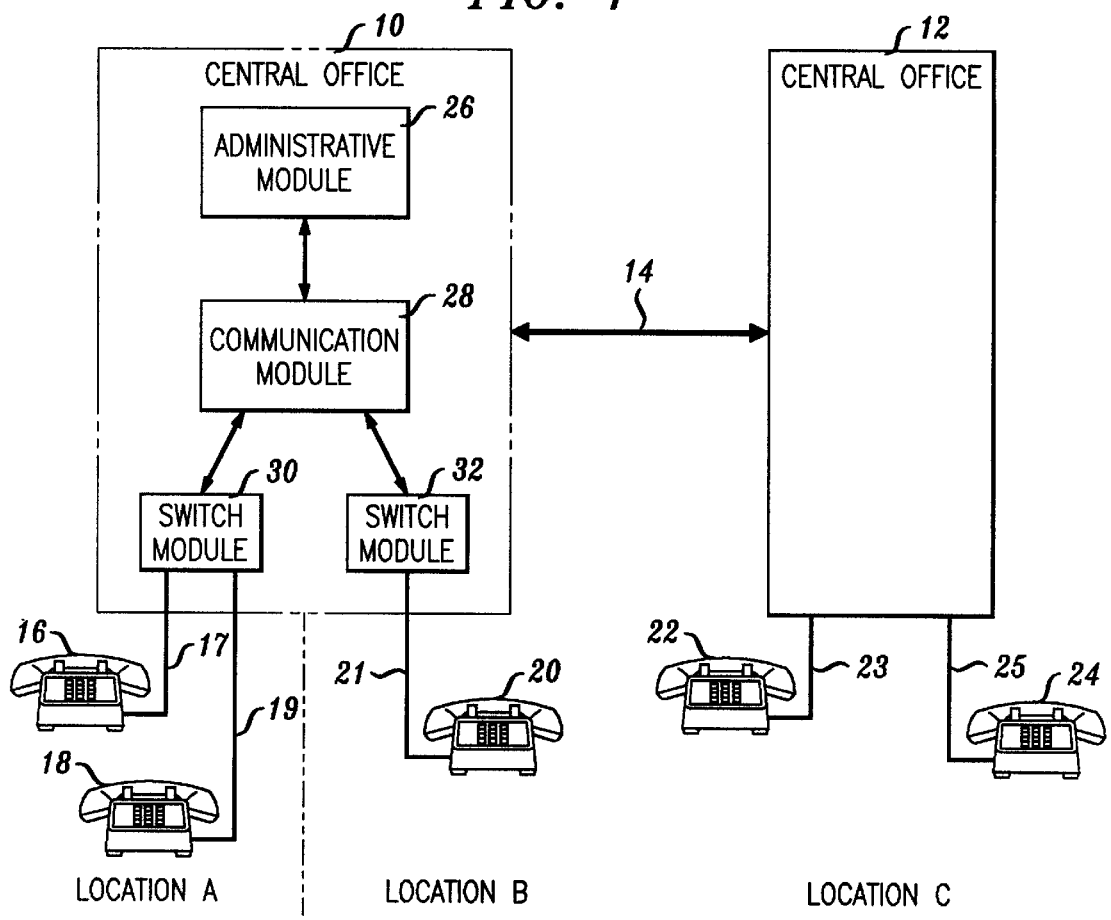
FIG. 1 is a block diagram of a telecommunication network in accordance with an embodiment of the present invention.

Referring to FIG. 1, central office switches 10 and 12 are interconnected by a transmission facility 14 which supports voice and data traffic between subscribers as well as communication signaling between central offices. Central office switch 10 is coupled by lines 17 and 19 to subscribers associated with consumer premises equipment (CPE) 16 and 18 disposed at location A and coupled by line 21 to a subscriber associated with CPE 20 located at location B. Central office switch 12 is coupled by lines 23 and 25 to subscribers associated with CPE 22 and 24 which are disposed at location C. In the illustrative example, locations A, B, and C represent sufficiently separated geographic areas such that an audible alert (ringing) in one location cannot be heard by subscribers in a different location.

In this illustrative example, the central office switches 10 and 12 may comprise AT&T 5ESS® switches. The exemplary central office 10 may include an administrative module 26, a communication module 28, and switch modules 30 and 32. It will be understood that central office switch 12 may comprise a substantially identical structure. As is known, the switch modules 30 and 32 cooperate with the communications module 28 to provide operational and routing control functions for the switch. The switch module, communication module, switch module architecture provides the known time-space-time structure for providing a communications path between subscribers.

Figure 2:
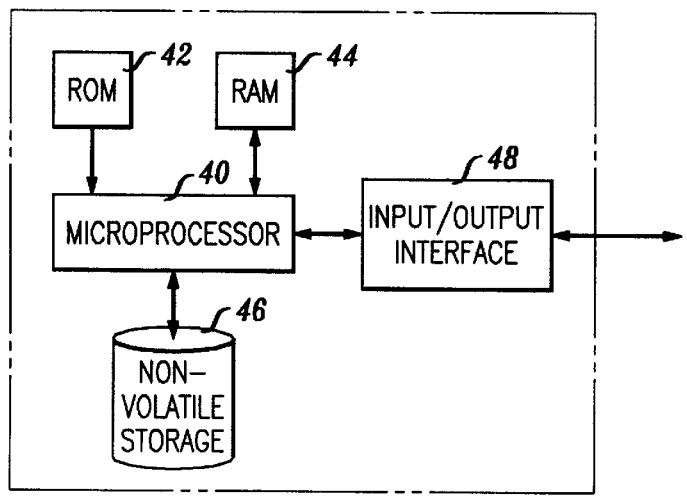
FIG. 2 is a block diagram of an exemplary module utilized in the central office as shown in FIG. 1.

FIG. 2 is a block diagram of an exemplary switch module 30 which illustratively includes a microprocessor 40 that is coupled to read-only memory (ROM) 42, random access memory (RAM) 44 and a nonvolatile storage device 46 such as a disk drive for storing data. An input/output interface device 48 enables microprocessor 40 to receive information and transmit instructions to communication module 28.

FIG. 3 is an exemplary table 50 of called party feature records. This represents the storage of information in a database which may be disposed in or associated with the central office switch, e.g. within the supporting switch module, of the called party. Column 52 defines the called party identification which may typically consist of the directory number of the called party. Column 54 defines, in accordance with the present invention, whether or not a subscriber can utilize an enhanced call pick-up feature. A "YES" in this column for a given subscriber indicates that the feature is available. Column 56 stores a directory number of another CPE which is to also ring when the corresponding subscriber is called. Column 58 defines a selective ringing pattern which will be utilized to ring the secondary line as defined in column 56. In the illustrative example, the selected ring patterns are defined by numbers to represent various patterns and sequences of ringing information. The correlation between a number in column 58 and a ring pattern is defined in another table (not shown). Column 60 represents other information as will be known in the art which may be associated with called party features. The rows or tuples of table 50 correspond to separate called party subscribers such as indicated for subscribers 62 and 64.

FIG. 4 is an exemplary table 70 of originating party feature records such as stored in or associated with a central office which supports a subscriber originating a call. In column 72 the origination party identification is provided which may typically comprise the directory number of the origination party. Column 74 indicates whether the enhanced call pick-up feature is available or subscribed to by the user. Column 76 defines an enhanced call pickup feature code which identifies a code to be entered by the originating party to indicate that the subscriber desires to be connected to an incoming call previously identified by a selective ringing pattern. Column 78 represents that additional features associated with an originating party may be stored in the database. The rows 80 and 82 represent a record associated with two subscribers relating to call origination.

General Operation

In accordance with the embodiment of the present invention, a subscriber feature provides an enhanced remote call pick-up capability. A subscriber selects this feature in which incoming calls to the subscriber's directory number will cause another telephone to be rung with a selective ringing pattern while concurrently having the original destination subscriber's telephone ring with a normal ringing pattern. The purpose of the selective ringing pattern is to alert a user at the other predetermined telephone to the occurrence of an incoming call to the primary telephone. If the primary telephone is answered, the selective ringing to the remote telephone is terminated. If a party at the remote telephone desires to answer the call, the party at the remote location comes off-hook, the selective ringing terminates, and the party receives a conventional dial tone. If the party desires to answer the incoming call associated with the selective ringing, the party enters a call pick-up code, such as "*5". This code is interpreted by the central office serving the remote telephone as a request to establish a call path to the originating telephone associated with the previous message to generate selective ringing. The central office associated with the remote telephone transmits a message to the central office which serves the primary telephone indicative of the requested call completion by the remote telephone. Upon the central office associated with the primary telephone receiving this request, ringing to the primary telephone is terminated and call processing proceeds to provide a call path to the remote telephone.

This permits a subscriber to utilize a geographically remote location as an alternative to accepting calls incoming to the primary telephone. Such a capability supports an employee working at home in which the home telephone is the remote telephone and the normal office telephone is the primary telephone. For example, a work at home employee who doesn't answer his home telephone when the selective ringing occurs within a predetermined time, such as within five ringing cycles, could have instructions to have the primary office phone answered by an employee at the office. It will be apparent to those skilled in the art that a variety of applications exist for such a capability.

DETAILED EXAMPLE

For this illustrative implementation, assume that the subscriber associated with CPE 16 is the primary called party for an incoming call and that the subscriber has a called party feature record 62 as shown in FIG. 3. This record may be stored in switching module 30. Prior to the incoming call, the subscriber will have identified the secondary line (CPE) to be rung with a predetermined selected ringing pattern as indicated in record 62. The called party identification of the primary CPE in this example consists of the directory number 708-979-1234 associated with CPE 16. The secondary line associated with CPE 22 is identified by directory number 708-231-5678. With regard to CPE 22 an originating party feature record 80 is defined as shown in FIG. 4 indicating that the enhanced call pick-up feature is active and that the enhanced call pick-up code is "*5".

The actions which follow explain the processing of an incoming call in accordance with the enhanced call pick-up feature of an embodiment of the present invention.

(1) Subscriber 20 initiates a call to subscriber 16 via central office switch 10.

(2) In processing the call request, switch 10 identifies the called party feature record 62 based on the called party 16. Since the enhanced call pick-up feature is active as indicated by this record, central office switch 10 generates a message containing the secondary telephone directory number and the selective ringing pattern defined in accordance with record 62. This message is transmitted from switch 10 to switch 12 which supports CPE 22.

(3) Switch 10 completes initial call processing by applying normal ringing to CPE 16.

(4) Switch 12, upon receiving the message from switch 10, identifies the line associated with CPE 22 based on the directory number stored in the message and initiates a selective ringing pattern at CPE 22 based upon the predetermined selective ringing pattern data which was also contained in the message. Note that switch 12 is only causing selective ringing in response to the receipt of the message, i.e. the message is not a request for a call path to CPE 22.

(5) Assuming that CPE 16 is first answered, the off-hook indication by CPE 16 is recognized by switch 10 which permits call completion to CPE 20.

(6) Upon the call completion, switch 10 automatically generates a ring termination message which is sent to switch 12. The ring termination message identifies CPE 22 by its directory number and causes switch 12 to terminate the selective ringing.

(7) The above steps explain the call processing associated with the enhanced remote call pick-up feature in accordance with an embodiment of the present invention in which the primary phone is answered first.

A further example similar to the above-described actions is provided illustrating call processing when the remote telephone is answered prior to the primary telephone being answered.

(8) Assume that the subscriber associated with CPE 20 again places a call to CPE 16 which contains a record 62 as explained above. The above actions 1–4 are taken as described above.

(9) A party associated with CPE 22 answers the selective ringing, i.e. comes off-hook. The call information associated with the record 62 which was transmitted in a message from switch 10 to switch 12 is stored in switch 12 for further call processing.

(10) In response to an off-hook condition by CPE 22 following the selective ringing, central office switch 12 provides a conventional dial tone which permits normal call origination from CPE 22. Switch 12 identifies an originating party feature record 80 associated with CPE 22.

(11) Assuming the party at CPE 22 desires to accept the incoming call associated with the generation of the selective ringing pattern, the party enters the enhanced call pick-up code "*5". Since the enhanced call pick-up feature in record 82 is activated, switch 12 generates a message to switch 10 upon receiving the enhanced call pick-up code. This indicates a desire for call completion to CPE 22 of the associated incoming call.

(12) Switch 10, upon receiving the message from switch 12, terminates ringing being generated to CPE 16 and causes the current call request to be routed through trunk 14 and switch 12 to CPE 22.

Various modifications and design changes to the illustrative embodiments could be accomplished within the scope of the present invention. Although the above example illustrated a call request in which the remote telephone was associated with a different central office switch, those skilled in the art will appreciate that both the primary and secondary telephones could be supported by the same switch. For example, switch 12 could generate a message upon first receiving an off-hook condition from CPE 22 causing switch 10 to immediately terminate the ringing associated with CPE 16. It will also be apparent that default conditions could be established as to which party will prevail when a concurrent off-hook condition by both the primary and secondary telephone occurs, such as having the default condition cause the primary telephone to receive the incoming call. Should the call origination party associated with CPE 20 hang up prior to completion of the call to CPE 16 or CPE 22, central office 10 extinguishes the local ringing associated with CPE 16 and sends a message to central office switch 12 causing selective ringing to terminate at CPE 22. More than one remote line could be associated with the primary line so that a plurality of remote lines would have concurrent alternate ringing upon an incoming call to the primary line. In the case of a plurality of remote lines all associated with the same primary line, each remote line could utilize the same alternative ring pattern or could utilize different ring patterns depending on the application and purpose.

Although an embodiment of the present invention has been described above and illustrated in the drawings, the scope of the invention is defined by the claims which follow.

The invention claimed is:

1. A method for providing remote call pick up comprising the steps of:
   receiving a request for a call to a first analog consumer premises equipment (CPE);
   reading a first record associated with the first CPE in a first database, said first record containing a directory number for a second analog CPE;
   sending a standard ring pattern to said first CPE and causing a concurrent alternate ring pattern to be sent to said second CPE without establishing a call path to said second CPE, said alternate ring pattern signifying that the second CPE is not the original destination of call;
   completing the call to the second CPE if a remote call pick up code is received from the second CPE before the first CPE goes off-hook, whereby remote call pick up at the second CPE is facilitated.

2. The method according to claim 1 further comprising the step of generating a ring termination message upon the first CPE going off-hook to terminate ringing at the second CPE.

3. The method according to claim 1 wherein said causing step further comprises the step of generating an initiate ring message containing the directory number of the second CPE following said reading step, said initiate ring message received by a switch which supports the second CPE, said switch delivering said alternate ring pattern to the second CPE upon receiving said initiate ring message without establishing a call path to said second CPE.

4. The method according to claim 3 wherein said first record contains a ring pattern code that defines the alternate ring pattern to be used in ringing the second CPE, said initiate ring message containing the ring pattern code.

5. The method according to claim 1 wherein the first record contains a directory number for a third analog CPE associated with the first CPE, the method further comprising the steps of concurrently sending an alternate ring pattern to said third CPE without establishing a call path to said third CPE, completing the call to the third CPE if a remote call pick up code is received from the third CPE before the first and second CPE go off-hook.

6. A telecommunication switch that provides remote call pick up comprising:
   means for receiving a request for a call to a first analog consumer premises equipment (CPE);
   means for reading a first record associated with the first CPE in a first database, said first record containing a directory number for a second analog CPE;
   first means for causing said first CPE to ring with a standard ring pattern;
   second means for causing said second CPE to concurrently ring with an alternate ring pattern without establishing a call path to said second CPE, said alternate ring pattern signifying that the second CPE is not the original destination of call;
   means for completing the call to the second CPE if a remote call pick up code is received from the second CPE before the first CPE goes off-hook, whereby remote call pick up at the second CPE is facilitated.

7. The switch according to claim 6 further comprising means for generating a ring termination message upon the first CPE going off-hook to terminate ringing at the second CPE.

8. The switch according to claim 6 wherein said second causing means further comprises means for generating an initiate ring message containing the directory number of the second CPE without establishing a call path to said second CPE, said switch delivering said alternate ring pattern to the second CPE upon receiving said initiate ring message.

9. The switch according to claim 8 wherein said first record contains a ring pattern code that defines the alternate ring pattern to be used in ringing the second CPE, said initiate ring message containing the ring pattern code.

10. The switch according to claim 6 wherein the first record contains a directory number for a third analog CPE associated with the first CPE, the switch further comprising means for concurrently sending an alternate ring pattern to said third CPE without establishing a call path to said third CPE, and means for completing the call to the third CPE if a remote call pick up code is received from the third CPE before the first and second CPE go off-hook.

11. In a telecommunication switch, a method for providing remote call pick up comprising:
   receiving a request for a call to a first analog consumer premises equipment (CPE);
   reading a first record associated with the first CPE in a first databases said first record identifying a second analog CPE;
   ringing said first CPE with a standard ring pattern;
   generating and sending a ring control message causing said second CPE to concurrently ring with an alternate ring pattern without the establishment of a call path to said second CPE, said alternate ring pattern signifying that the second CPE is not the original destination of call;
   upon an answer by one of the first and second CPE completing the call to said one of the first and second CPE, whereby remote call pick up at the second CPE is facilitated.

12. The method according to claim 11 wherein said completing step comprises completing a call path to the second CPE if a remote call pick up code is received from the second CPE before the first CPE goes off-hook.

13. The method according to claim 11 further comprising generating a ring termination message upon the first CPE going off-hook to terminate ringing at the second CPE.

14. The method according to claim 11 wherein said first record contains a ring pattern code that defines the alternate ring pattern to be used in ringing the second CPE, said ring control message containing the ring pattern code.

15. The method according to claim 11 wherein the first record contains a directory number for a Gird analog CPE associated with the first CPE, the method further comprising generating and sending another ring control message causing said third CPE to concurrently ring with an alternate ring pattern without the establishment of a call path to said third CPE, said alternate ring pattern signifying that the third CPE is not the original destination of call, upon an answer by one of the first, second, and third CPE, completing the call to said one of the first, second, and third CPE, whereby remote call pick up at the second and third CPE is facilitated.

16. The method according to claim 11 wherein said first and second CPE are coupled to first and second switches, respectively, said ring control message being transmitted from said first switch to said second switch, said first switch ringing the first CPE and the second switch ringing the second CPE with the alternate ring pattern.

17. The method according to claim 1 wherein said first and second CPE are coupled to first and second switches, respectively, a ring control message being transmitted from said first switch to said second switch, said first switch ringing the first CPE and the second switch ringing the second CPE with the alternate ring pattern.

18. The switch according to claim 6 wherein said first CPE is coupled to said switch and said second CPE is coupled to another switch, a ring control message being transmitted from said switch to the another switch, said switch ringing the first CPE and the another switch ringing the second CPE with the alternate ring pattern.

\* \* \* \* \*